United States Patent [19]
Green et al.

[11] Patent Number: 5,636,967
[45] Date of Patent: Jun. 10, 1997

[54] BOARD HANDLING APPARATUS

[76] Inventors: David C. Green, 1857 Brookfield Rd., Charlotte, Mich. 48813; Roger L. Green, 40 S. Clark Rd., Nashville, Mich. 49073

[21] Appl. No.: 534,007

[22] Filed: Sep. 22, 1995

[51] Int. Cl.$^6$ ................................................. B65G 57/18
[52] U.S. Cl. ........................... 414/793.4; 414/793.8
[58] Field of Search ...................... 414/793.4, 793.5, 414/793.6, 793.8

[56] References Cited

U.S. PATENT DOCUMENTS

| | | |
|---|---|---|
| 3,347,215 | 10/1967 | Lunden . |
| 3,393,812 | 7/1968 | Mayo et al. . |
| 3,531,001 | 9/1970 | Lunden . |
| 3,610,443 | 10/1971 | Brumunddal et al. . |
| 3,737,052 | 6/1973 | Lunden . |
| 3,737,053 | 6/1973 | Lunden . |
| 3,743,113 | 7/1973 | Eaton et al. . |
| 3,760,959 | 9/1973 | Newnes . |
| 3,904,046 | 9/1975 | Lunden . |
| 3,908,834 | 9/1975 | Lunden . |
| 3,968,886 | 7/1976 | Leon . |
| 4,024,964 | 5/1977 | Hellstrom et al. . |
| 4,057,150 | 11/1977 | Lunden . |
| 4,067,457 | 1/1978 | Schiepe . |
| 4,159,058 | 6/1979 | Zimmerman . |
| 4,193,725 | 3/1980 | Schiepe et al. . |
| 4,201,506 | 5/1980 | Rysti . |
| 4,249,843 | 2/1981 | Kerr . |
| 4,253,787 | 3/1981 | Lunden et al. . |
| 4,274,781 | 6/1981 | Rysti . |
| 4,290,723 | 9/1981 | Johansson . |
| 4,324,521 | 4/1982 | Lunden et al. . |
| 4,892,458 | 1/1990 | Proulx .................... 414/791.6 |

OTHER PUBLICATIONS

Exhibit A is a product brochure entitled "Mak-Stacker", published by Speed Cut, Inc., of Corvallis, Oregon, publication date unknown, that discloses a sequenced board stacker in prior art.

Exhibit B is a product brochure entitled "TTS Auto Stacker", published by Jager Industries Inc., of Calgary, Alta, Canada, publication date unknown, that discloses an automatic board stacker in prior art.

Primary Examiner—Karen B. Merritt
Assistant Examiner—Janice L. Krizek
Attorney, Agent, or Firm—Price, Heneveld, Cooper, DeWitt & Litton

[57] ABSTRACT

A board handling apparatus for receiving, collecting, and stacking boards cut to length by a sawing device includes a frame, a plurality of take-away conveyors adjustably secured to the frame for receiving and collecting the boards, a scissor lift mechanism secured generally under the take-away conveyors for lifting a platform, and a pair of extendable fingers operably supported on the platform for raising/extending/lowering/retracting movement for stacking the collected boards on a pallet. The take-away conveyors are adjustably secured to the frame so that their spacing can be adjusted to an optimal spacing. Also, additional take-away conveyors can be added if desired. The fingers are adjustably secured on the platform so that their spacing can be adjusted to an optimal spacing. Additional fingers can be attached to the platform if desired. Also, additional lift mechanisms can be added with additional platforms to expand the capability of the board handling apparatus. A controller is operably connected to the scissor lift mechanism(s) to provide manual, semiautomatic or automatic operation.

19 Claims, 5 Drawing Sheets

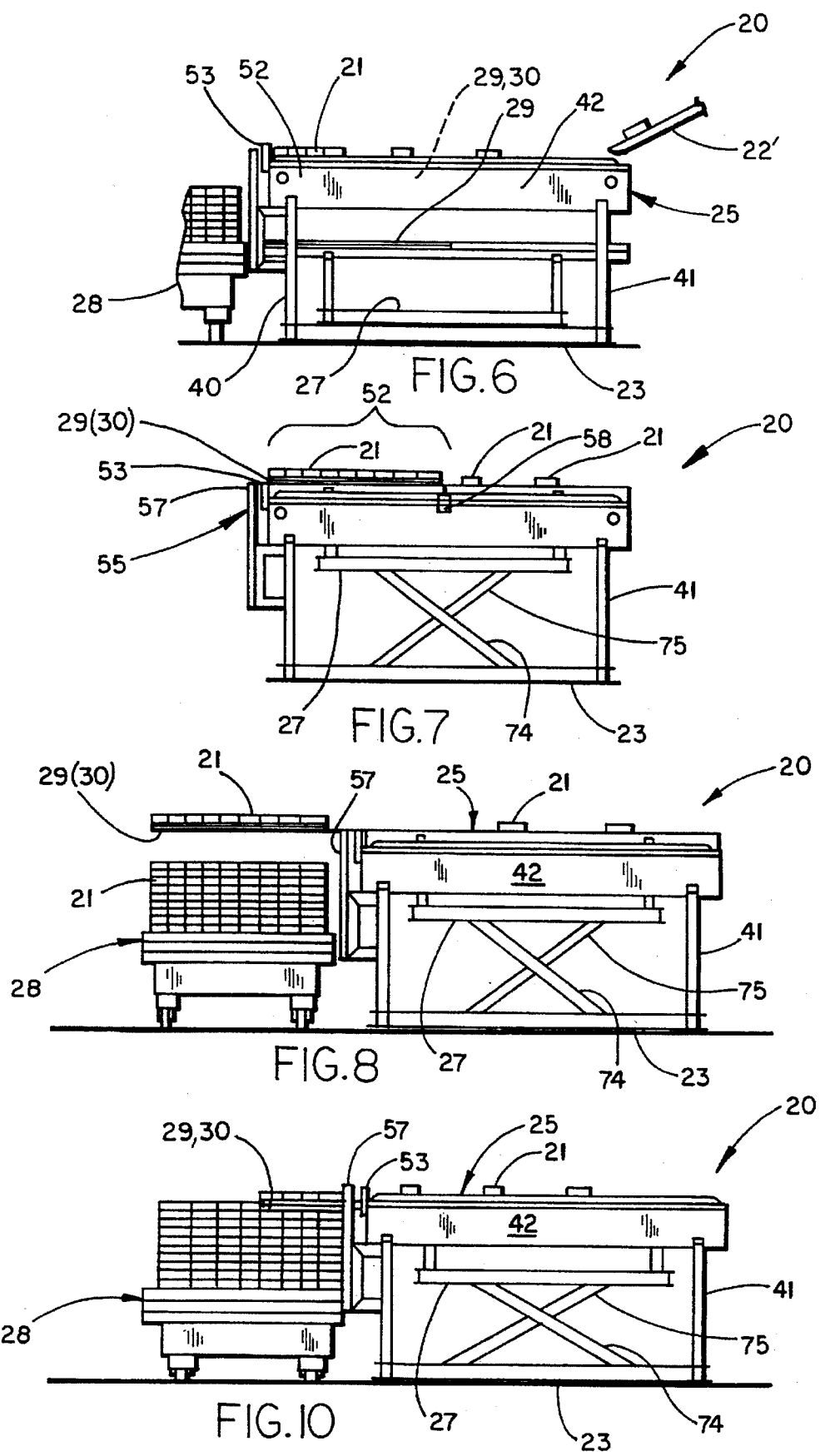

BOARD HANDLING APPARATUS

BACKGROUND OF THE INVENTION

The present invention concerns a board handling apparatus for handling wood boards from a sawing device, and more particularly concerns a board handling apparatus constructed for automatic, semi-automatic, or manual stacking of boards, and also constructed for adjustment and for modular interconnection with other identical board handling apparatus.

Trusses made from wood require a plurality of different length boards. Further, the ends of the boards must be cut at angles to mateably butt against other boards in the truss. The boards are first cut to length with desired end cut angles and stacked on a pallet until such time as they can be arranged and connected together in an assembly operation. Sometimes, the volumes of trusses ordered are high enough such that it is most efficient to stack identical boards in the same stack. Thereafter, the boards are picked from various stacks as needed and arranged for interconnecting by the assembly operation. However, sometimes the volumes are not high enough to justify stacking identical boards in the same stack. Instead, it is more efficient to stack the boards in mixed stacks. In such case, a given stack or two contain substantially all of the boards needed for a particular type of truss. Various hybrid stacking arrangements are used depending upon the requirements and needs of particular truss-manufacturing facilities.

The sawing operation in a truss manufacturing facility is one of the busiest and most important parts of the truss manufacturing facility, and its efficiency can determine the profitability of the truss manufacturing facility. A particularly difficult and manual labor intensive job in the sawing operation is unloading cut boards and selectively stacking them on pallets for later arrangement/assembly. Most truss manufacturing facilities use an unloading operator or "catcher" to unload boards from the sawing operation. The unloading operator controls the board stacking, and repeatedly switches between different stacking techniques to provide the optimal stacked board bundles for optimal later arrangement/assembly. However, unloading operators often become fatigued and make mistakes. Further, unloading operators may handle several thousands of pounds of boards in a given day, such that they soon slow down and become less than optimally efficient. Also, the board handling operation requires bending and lifting, such that board unloading operators are subject to back aches and injuries if they are not careful.

Board handling apparatus are known which automatically stack boards from sawing operations into stacks/bundles. However, known board handling apparatus are usually custom designed to handle and stack boards that have a relatively consistent and predictable length. Known board handling apparatus cannot be easily adjusted on site to handle different length boards. Further, known board handling apparatus are bulky and/or are sufficiently massive such that they must be moved out of the way when they are not being used. For example, some board handling apparatus are mounted on tracks so that they can be moved out of the way when the board handling apparatus is not being used. However, it takes time to move the board handling apparatus, and also the apparatus may need to be moved several times during an unloading operator's shift, such that, even with tracks, the process is not efficient. Further, known board handling apparatus are not expandable or modular, but instead tend to be customized for particular situations. Still further, many board handling apparatus are overly complex and/or require constant maintenance.

Thus, a board handling apparatus is desired solving the aforementioned problems, and which is adjustable, expandable, durable, affordable, and mechanically non-complex, yet which permits manual and automatic handling of boards.

SUMMARY OF THE INVENTION

In one aspect, the present invention includes a board handling apparatus for receiving, collecting, and stacking boards cut to length by a sawing device. The board handling apparatus includes a take-away conveyor for receiving and collecting boards cut to length by the sawing device, and a lift. The take-away conveyor includes a collecting station for collecting the boards and further includes a conveying mechanism for moving boards to the collecting station. The lift is positioned generally under the collecting station and includes a pair of fingers for lifting and placing the boards collected in the collecting station onto a pallet. The lift includes a movable platform for operably supporting the pair of fingers, a scissor lifting mechanism for lifting/lowering the platform, a guide for guiding the extension of the fingers, and an extension actuator for extending/retracting the fingers as a unit. The fingers are located generally under the collecting station in a non-interfering position when in a retracted lowered position such that the take-away conveyor can be used in a manual mode without interference from the lift if desired. A controller is operably connected to the board handling apparatus for selectively controlling the lift including the scissor lifting mechanism and the extension actuator. The controller controls the board handling apparatus for automatic operation and manually controlled operation wherein the fingers move through a sequence including lifting the boards collected on the take-away conveyor, extending the fingers so that the collected boards are positioned beyond an end of the take-away conveyor, lowering the fingers so that the fingers and the boards are rested on a stack of previously deposited collected boards, and retracting the fingers to a retracted position so that the collected boards are deposited on the stack of previously deposited collected boards and wherein the fingers are positioned in the retracted lowered position ready for a new cycle. The take-away conveyor is operable independent of the lift so that an operator can manually unload boards collected in the collecting station without having to move the board handling apparatus out of the way.

In another aspect, the present invention includes a modular board handling apparatus having a frame, and at least two modular take-away conveyors adjustably attached to the frame for receiving and collecting boards cut to length by a sawing device. The modular take-away conveyors each include a collecting station for collecting boards and further include a conveying mechanism for moving boards to the collecting station. The board handling apparatus also includes a drive for driving the at least two modular take-away conveyors simultaneously. The board handling apparatus still further includes at least one modular lift positioned generally below the at least two modular take-away conveyors. The at least one modular lift includes at least two modular fingers operably supported on the lift for lifting and placing boards collected in the collecting station onto a pallet, the fingers being movable sequentially between a raised position, an extended position, a lowered position, and a retracted position.

These and other features and advantages of the present invention will be further understood and appreciated by

DESCRIPTION OF DRAWINGS

FIGS. 6–10 are schematic side elevational views showing the board handling apparatus of FIG. 1 as it moves between a board-collecting retracted/lowered position (FIG. 6), a board-lifted retracted/raised position (FIG. 7), an extended/raised position (FIG. 8), a board-depositing extended/lowered position (FIG. 9), and a board-depositing partially-retracted/partially-lowered position (FIG. 10), respectively;

DETAILED DESCRIPTION OF PREFERRED EMBODIMENTS

Figure 12:
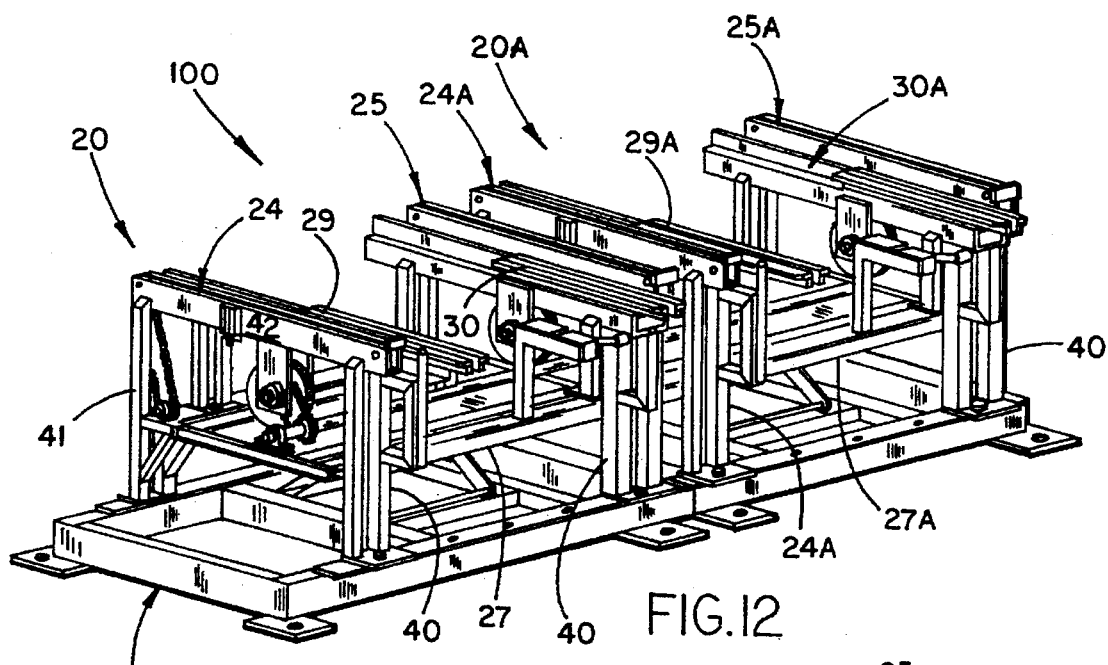
FIG. 12 is a perspective view of the board handling apparatus shown in FIG. 1 but interconnected in a modular arrangement side-by-side for tandem, coordinated, and simultaneous operation.
Figure 11:
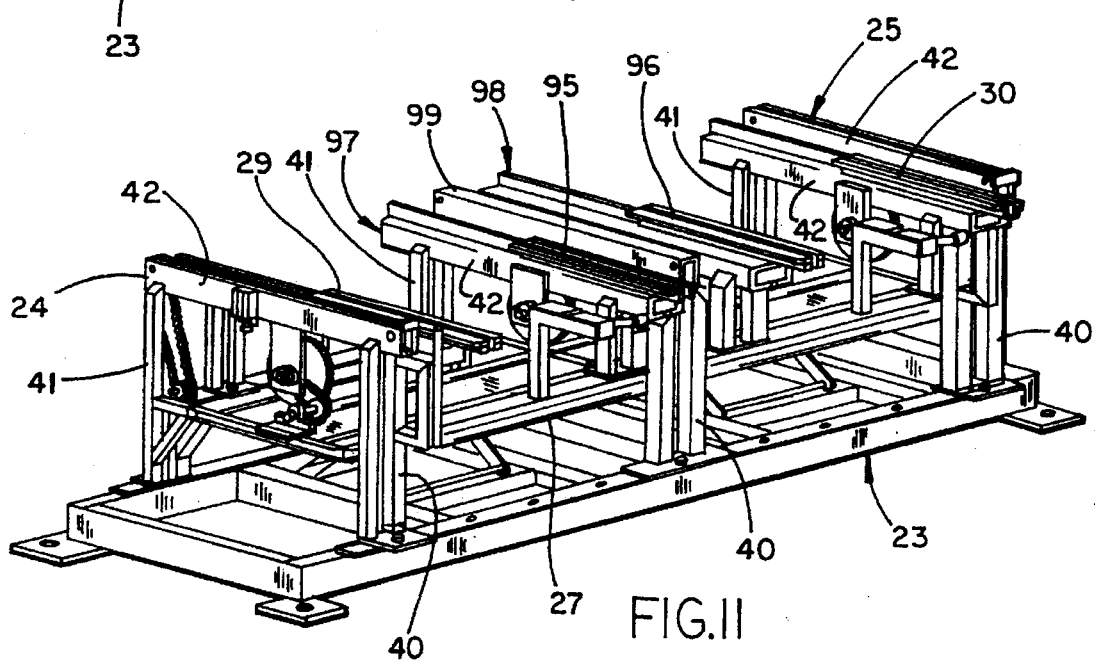
FIG. 11 is a perspective view of the board handling apparatus shown in FIG. 1 but including an intermediate third modular conveying mechanism interconnected to the frame, and intermediate third and fourth fingers operably connected to the lifting platform.

A board handling apparatus 20 (FIG. 1) for receiving, collecting, and stacking boards 21 cut to length by a sawing device 22 includes a frame 23, a plurality of take-away conveyors such as take-away conveyors 24 and 25 adjustably secured to the frame 23 for receiving and collecting the boards 21, a scissor lift mechanism 26 secured generally under and between the take-away conveyors 24 and 25 for lifting a platform 27, and a pair of extendable fingers 29 and 30 operably and adjustably supported on the platform 27 for raising/extending/lowering/retracting movement for stacking the collected boards 21 on a wheeled pallet 28 (FIG. 8). The take-away conveyors 24 and 25 are adjustably secured to the frame 23 so that their spacing can be adjusted to an optimal spacing. Also, additional take-away conveyors (see FIGS. 11–12) can be added if desired. The fingers 29 and 30 are adjustably secured on the platform 27 so that their spacing can also be adjusted to an optimal spacing. Additional fingers (FIG. 11) can be attached to the platform 27 and/or additional lift mechanisms can be added with additional platforms (FIG. 12) to expand the capability of the board handling apparatus 20. A controller 31 is operably connected to the scissor lift mechanism 26 and to actuators for operating the fingers 29 and 30 to provide manual, semiautomatic or automatic operation.

Figure 5:
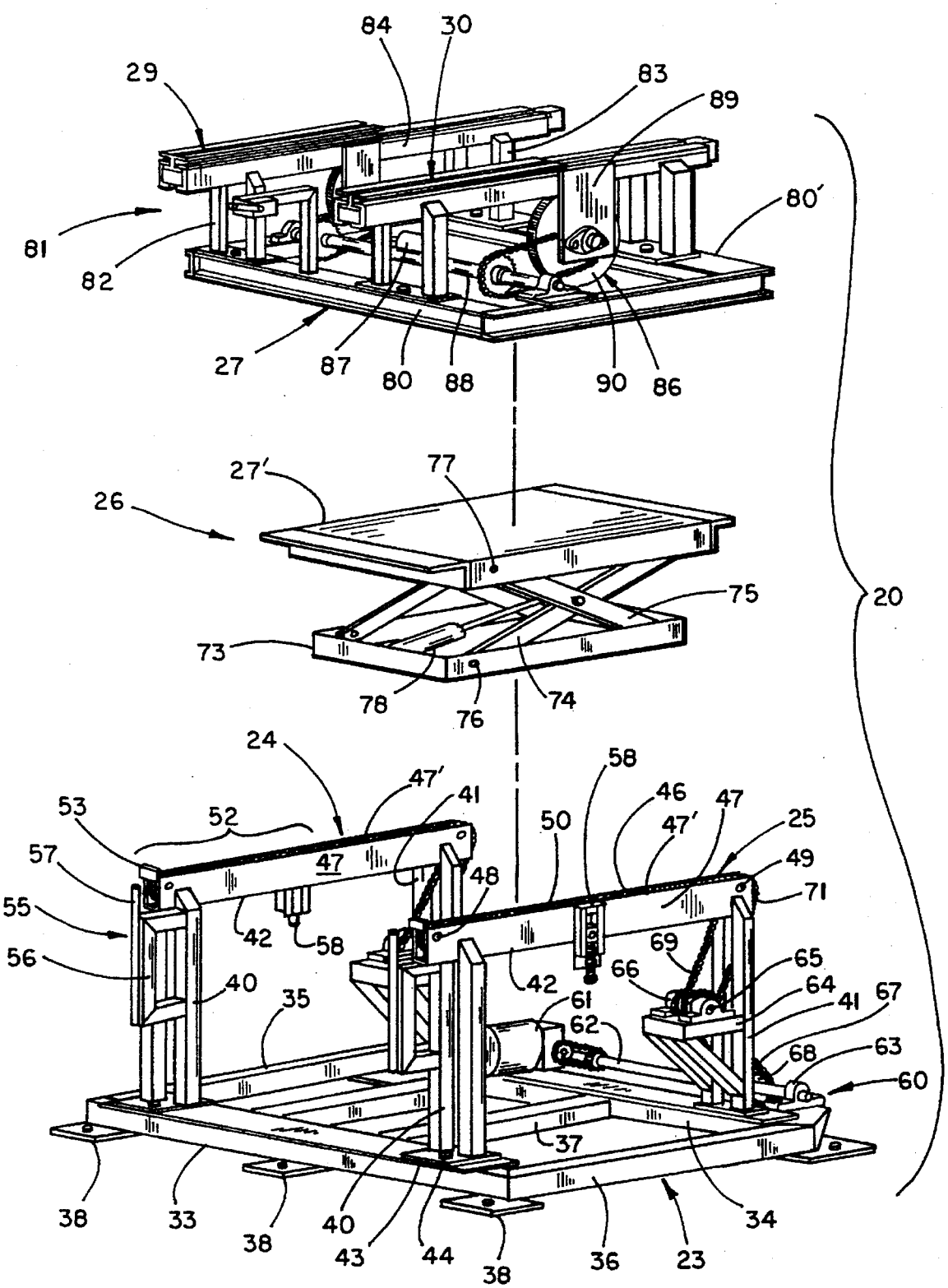
FIG. 5 is an exploded perspective view of the board handling apparatus shown in FIG. 1.

The frame 23 (FIG. 5) includes side beams 33 and 34 and end beams 35 and 36, and further includes intermediate beams 37 as needed for rigidity. Adjustable height anchors or feet 38 are attached to beams 33–37 as needed to stably engage a floor. It is contemplated that beams 33–37 will be box beams, but that they could be substantially any structural shape necessary for providing a secure and rigid support for apparatus 20.

Take-away conveyors 24 and 25 are substantially identical. Each conveyor 24 and 25 (FIG. 5) includes a pair of spaced apart stands 40 and 41 interconnected by a generally horizontally oriented cross beam 42. Stand 40 includes a foot 43 having holes alignable with corresponding holds on side beam 33, such that bolts 44 can be used to secure stand 40 to side beam 33. Stand 41 is similarly constructed for attachment to side beams 34. Side beams 33 and 34 potentially include a plurality of holes, such that stands 40 and 41 can be bolted at various adjusted positions along side beams 33 and 34. The illustrated stands 40 and 41 include two vertical box beams, but alternative constructions are also contemplated.

Figure 1:
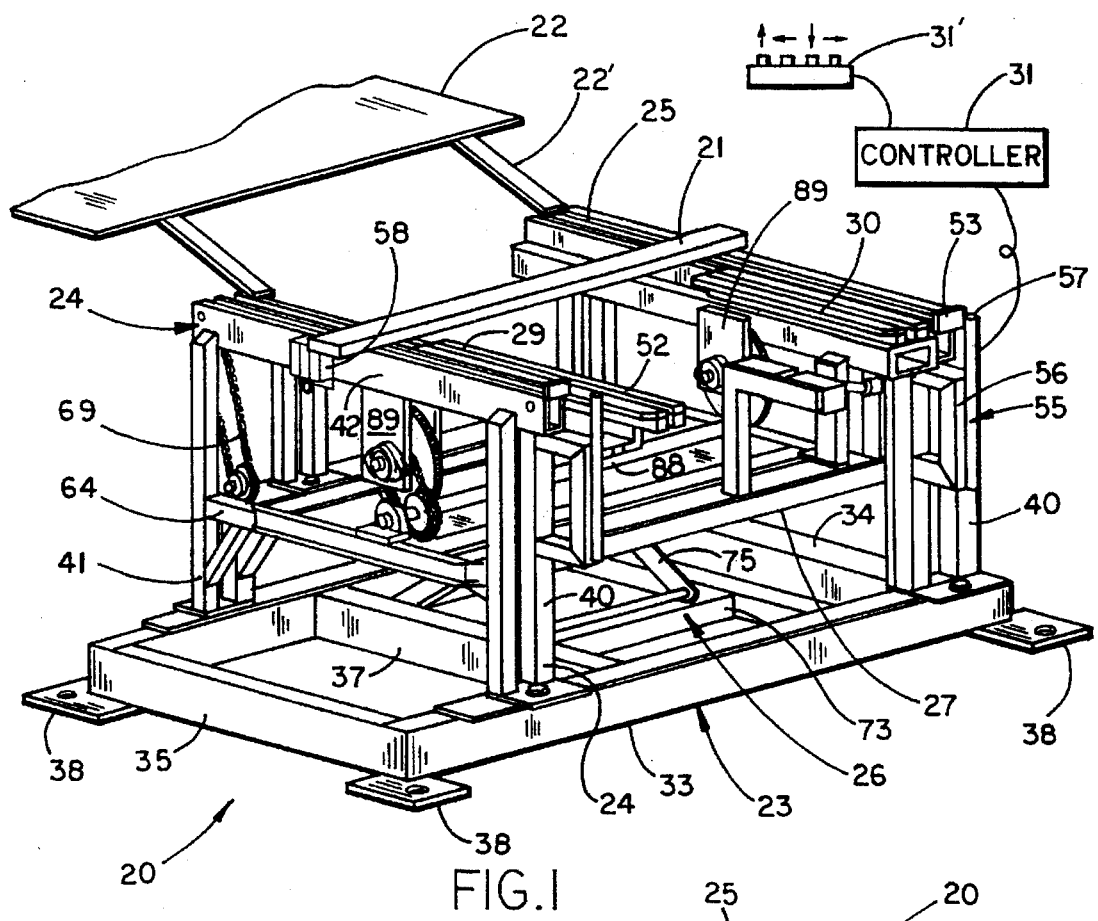
FIG. 1 is a perspective view of a board handling apparatus embodying the present invention.
Figure 2:
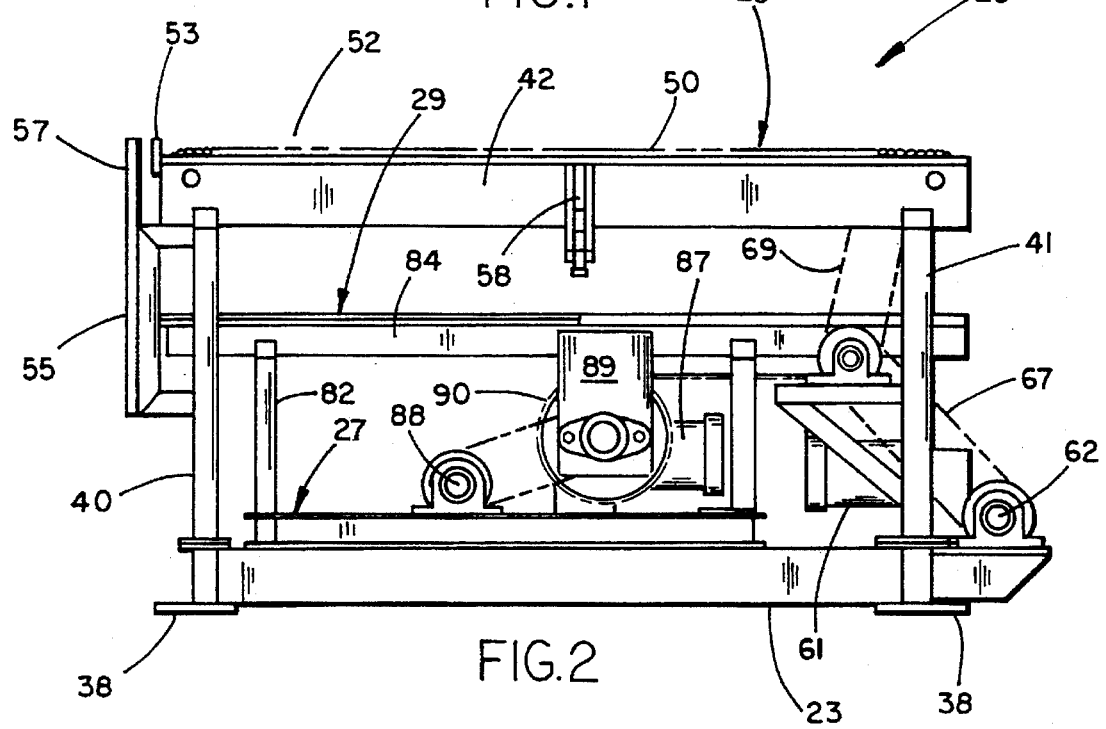
FIG. 2 is a side elevational view of the board handling apparatus shown in FIG. 1.
Figure 3:
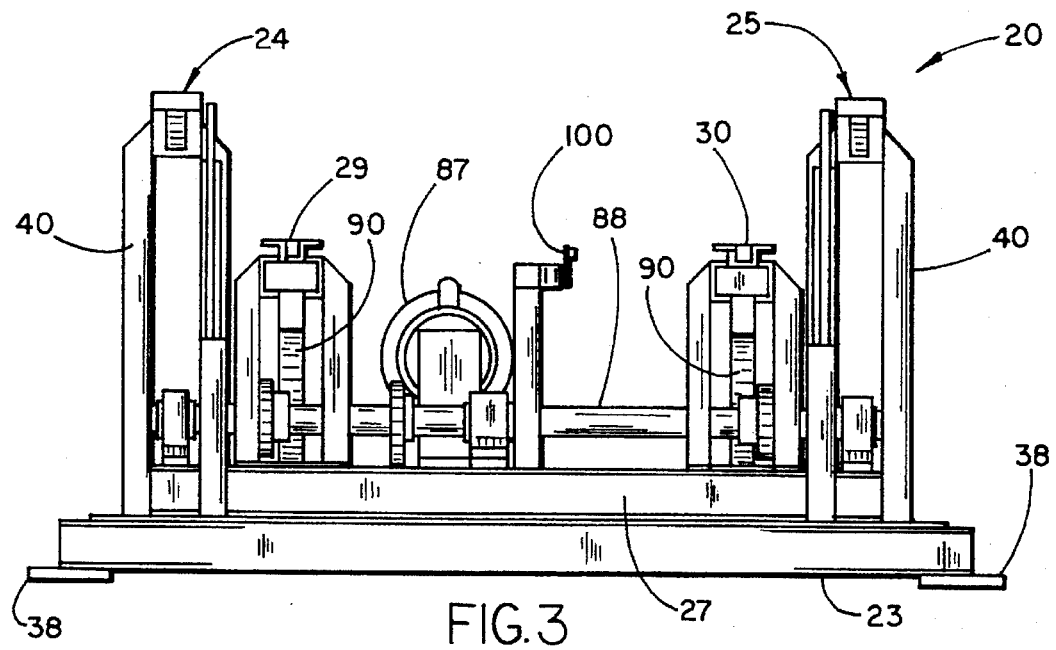
FIG. 3 is a front elevational view of the board handling apparatus shown in FIG. 1.
Figure 4:
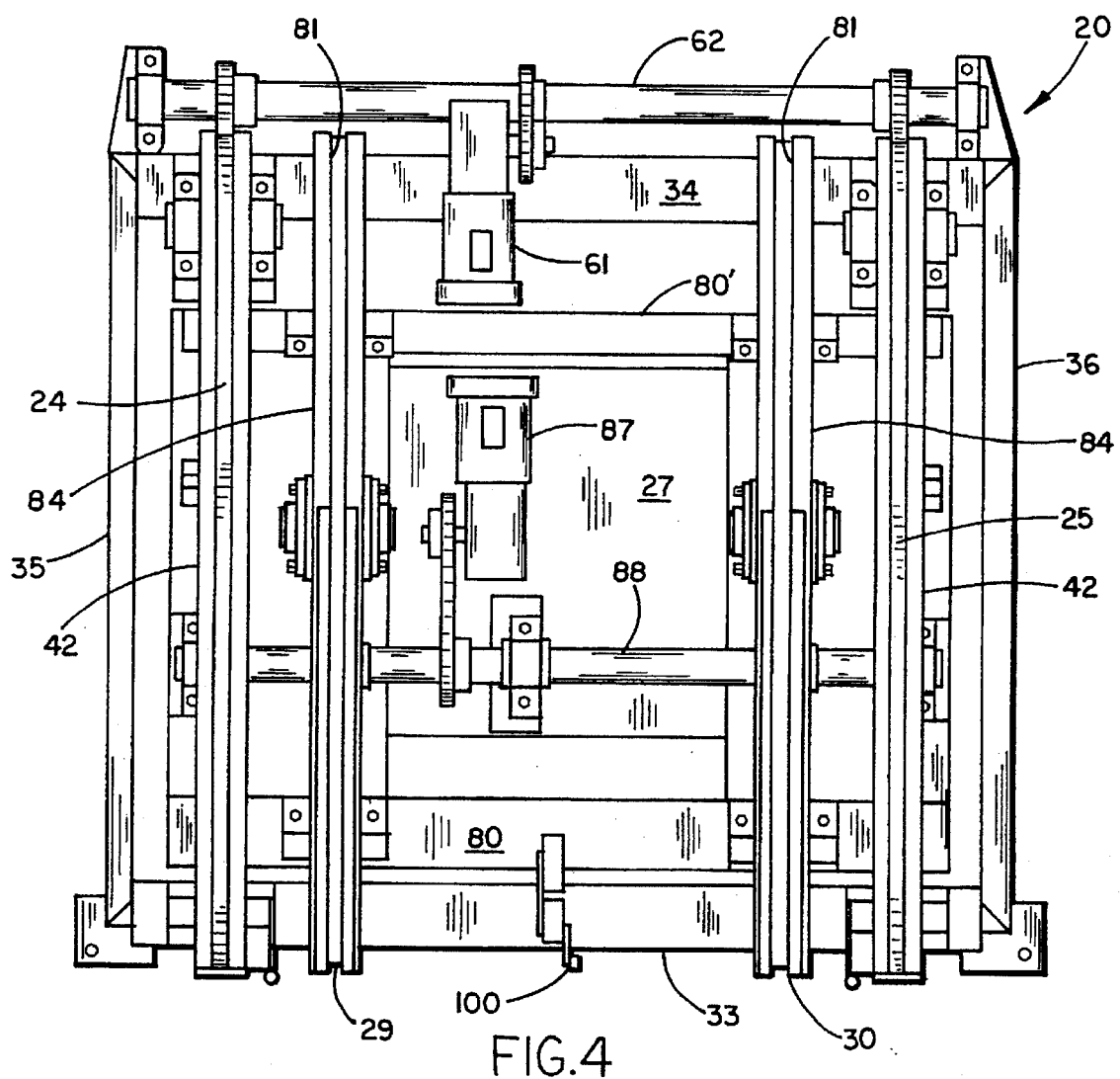
FIG. 4 is a plan view of the board handling apparatus shown in FIG. 1.

Cross beam 42 is box-shaped and includes side flanges 46 and 47 and a shelf 47', that extends between side flanges 46 and 47, that defines a chain guide therebetween. Sprockets 48 and 49 are rotatably secured between side flanges 46 and 47 at each end of cross beam 42. A chain 50 is extended between sprockets 48 and 49, the upper section of chain 50 resting on shelf 47' and extending slightly above the upper edge of side flanges 46 and 47 so that boards 21 rested on conveyor 24 will be carried by the chain 50 along conveyor 24. The boards 21 are dropped transversely onto the upstream end of cross beams 42 of conveyors 24 and 25 by chute 22' of sawing device 22 (FIG. 1). The downstream or forward half of conveyor 24 defines a board collecting station 52. A stop 53 is attached to the downstream end of conveyor 24 for abutting against boards 21 being conveyed along conveyor 24 to hold the boards as the boards 21 collect in the collecting station 52.

Another stop 55 is attached to the downstream end of conveyor 24 on stand 40 to facilitate unloading the collected boards 21 from finger 29 (and 30). Stop 55 includes a laterally extending U-shaped framework 56 attached to stand 40 and an upwardly protruding stop member 57. Stop member 57 includes an upper end that is about equal to the height of the stop 53 on collecting station 52. A limit switch 58 is attached about midway along cross beam 42 to define the upstream end of collecting station 52. Limit switch 58 is adjustably positioned on cross beam 42, and is operably connected to controller 31 for indicating when the collecting station 52 is filled with boards 21.

Conveyors 24 and 25 (FIG. 5) are driven with a chain drive mechanism 60 that includes a drive motor 61 supported on frame 23, and a drive shaft 62 operably connected to drive motor 61 that extends along rear side beam 34. Drive shaft 62 is supported by bearings 63 on frame 23. Each conveyor 24 (and 25) includes a reinforced bracket 64 that supports an intermediate shaft 65 on bearings 66. A drive chain 67 extends between a drive sprocket 68 on drive shaft 62 and a second sprocket on intermediate shaft 65. Another drive chain 69 extends between a secondary drive sprocket on intermediate shaft 65 and a sprocket 71 on the upstream end of conveyor 24.

The scissor lift mechanism 26 (FIG. 5) includes a rectangular stationary base 73 secured to frame 23 and a movable platform 27' attached to finger supporting platform 27. The platform 27' is movably secured to rectangular base 73 by two pair of X-shaped pivotally interconnected beams 74 and 75. Scissor lift beam 74 is pivoted to base 73 at pivot 76 and scissor lift beam 75 is pivoted to a secondary platform 27' at pivot 77. The bottom of scissor lift beam 75 and the top of scissor lift beam 74 are slidably connected to base 73 and platform 27', respectively, such that beams 74 and 75 operate with a scissor-like action that maintains the platform 27' in a nearly constant horizontal position. A lift actuator 78 comprising a hydraulic cylinder and extendable piston is operably connected between pivot 76 on base 73 and the midpoint of beams 74 and 75. As lift actuator 78 is extended, the beams 74 and 75 pivot generally upward so that the platform 27 is raised. Contrastingly, as lift actuator 78 is retracted, the beams 74 and 75 pivot generally downward causing platform 27 to lower.

The support of fingers 29 and 30 are substantially identical, and thus only finger 29 is described hereinafter. Platform 27 (FIG. 5) comprises a weldment including front beam 80 and a rear beam 80'. A finger-supporting subassembly 81 is secured to platform 27 for operably supporting finger 29. Finger-supporting subassembly 81 includes front and rear stands 82 and 83 and a cross beam 84. Stands 82 and 83 are bolted to front and rear beams 80 and 80'. Beams 80 and 80' include a plurality of holes and stands 82 and 83 include feet with matching holes so that stands 82 and 83 can be laterally adjustably secured along beams 80. Cross beam 84 defines an elongated cavity having a cross sectional shape configured to slidably, telescopingly support finger 29. Linear bearings are positioned in the cavity for supporting finger 29 so that finger 29 can be extended forward of cross beam 84 and forward of platform beam 80 to deposit collected boards 21 on a pallet 28, as discussed below. A trip switch 100 is mounted on the downstream end of lift platform 27 to count boards handled by apparatus 20.

A drive mechanism 86 (FIG. 5) is operably connected to finger 29 for extending/retracting finger 29 from finger-supporting assembly 81. Drive mechanism 86 includes a motor 87 and a drive shaft 88 operably connected to motor 87 and extending side-to-side of platform 27. A pair of brackets 89 extend downwardly from cross beam 84, and operably support a gear 90. The bottom of finger 29 defines a rack having teeth thereon, and gear 90 is configured to operably engage the rack so that finger 29 is extended/retracted as gear 90 is rotated. A limit switch is located along cross beam 84 and a pair of tabs on finger 29 strike the limit switch to indicate the position of finger 29 to control the extension/retraction of finger 29. Finger 30 is operably supported and driven similarly to finger 29.

Figure 9:
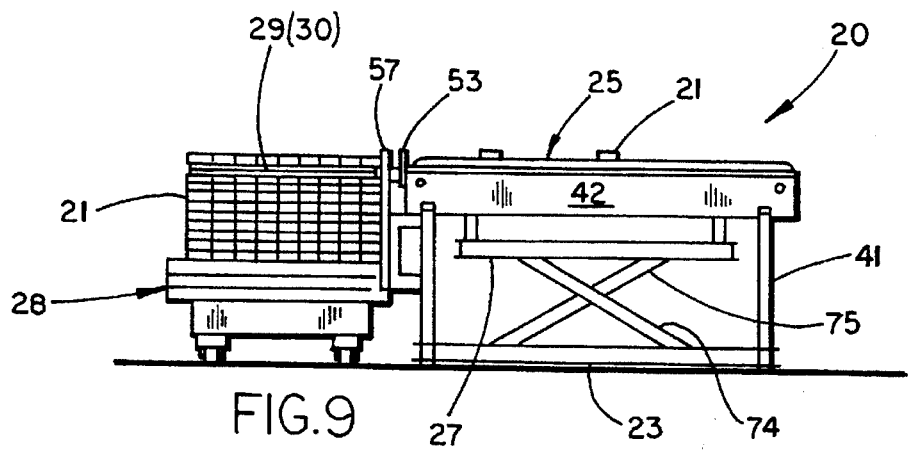

The controller 31 (FIG. 1) is operably connected to the finger motivating motor 87 and the lift actuator 78 to provide manual, semiautomatic or automatic operation. Specifically, the controller 31 includes a series of four pushbuttons 31' or other control means that allows manual control of the movement of fingers 29 and 30 for raising, extending, lowering, and retracting movement. Also, controller 31 is programmed to automatically or semi-automatically control the movement of the fingers. As shown in FIG. 6, fingers 29 and 30 are initially positioned in a lowered/retracted position. Boards 21 are moved by conveyors 24 and 25 into collecting station 52. When limit switch 58 indicates that collecting station 52 is full (FIG. 7), controller 31 automatically actuates lift actuator 78 to raise platform 27 including fingers 29 and 30. Once fingers 29 and 30 lift the collected boards 21 above collecting station 52, the controller 31 actuates drive mechanism 60 to extend fingers 29 and 30 (FIG. 8). Once fully extended, the fingers 29 and 30 are lowered until the fingers. 29 and 30 rest on pallet 28 or on boards 21 previously deposited on pallet 28 (FIG. 9). The controller 31 then causes fingers 29 and 30 to retract. As fingers 29 and 30 are retracted, stop member 57 butts against boards 21 such that the boards 21 are deposited as a new layer on the pallet 27 or as a new layer on boards previously deposited on pallet 28. Optimally, the outer ends of fingers 29 and 30 are tapered to facilitate depositing the boards as a uniform layer on the pallet 28. The trip switch 100 counts the boards 21 handled.

It is contemplated that the apparatus 20 can be operated semi-automatically or manually, such as by manipulation of switches, by joy stick 31' (FIG. 1). Additional fingers, such as fingers 95 and 96 and finger-supporting assemblies 97 and 98 (FIG. 11) can be attached to the platform 27 as desired to provide the support needed for handling the differently sized boards coming from the sawing device 22. Also, the width/lateral spacing of the fingers 29, 30, 95 and 96 can be adjusted as desired for optimal support of the boards 21 coming from the sawing device. Still further, intermediate take-away conveyors, such as conveyor 99, can be attached to frame 23 between conveyors 24 and 25.

An expanded board handling apparatus 100 (FIG. 12) includes two identical board handling apparatus 20 and 20A positioned adjacently and operably interconnected for simultaneous and coordinated movement. The apparatus 20 and 20A are operably interconnected to the controller 31 for simultaneous operation. Notably, the drive shafts 62 and 89 can be coupled together with corresponding drive shafts on the two apparatus 20 and 20A, or alternatively, the drive shafts 62 and 89 can be extended to drive all units simultaneously.

Thus a board handling apparatus for receiving, collecting, and stacking boards cut to length by a sawing device is provided that includes a frame, a plurality of take-away conveyors adjustably secured to the frame for receiving and collecting the boards, a scissor lift mechanism secured generally under the take-away conveyors for lifting a platform, and a pair of extendable telescoping fingers operably supported on the platform for raising/extending/lowering/retracting movement for stacking the collected boards on a pallet. The take-away conveyors and the fingers are adjustable for optimal positioning. Also, the apparatus is modular so that the apparatus can be expanded to handle longer boards or boards having different lengths as desired.

In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A board handling apparatus for receiving, collecting, and stacking boards cut to length by a sawing device, comprising:

a first take-away conveyor for receiving and collecting boards cut to length by the sawing device, the take-away conveyor including a collecting station for collecting the boards and further including a conveying mechanism for moving boards to the collecting station;

a first lift positioned generally under the collecting station including a pair of fingers for lifting the boards collected in the collecting station, the lift including a movable platform for operably supporting the pair of fingers, a scissor lifting mechanism for lifting/lowering the platform in a continuously generally horizontal position, a guide for guiding an extension and retraction of the fingers, and an extension actuator for extending/retracting the fingers as a unit, the fingers being located generally under the collecting station in a non-interfering position when in a retracted lowered position such that the take-away conveyor can be used without interference from the lift if desired; and a controller for selectively controlling the lift including the scissor lifting mechanism and the extension actuator, the controller being constructed for automatic operation and for manually controlled operation wherein the fingers move through a sequence including lifting the boards collected on the take-away conveyor, extending the fingers so that the collected boards are positioned beyond an end of the take-away conveyor, lowering the fingers so that the fingers and the boards are rested on a stack of previously deposited collected boards, and retracting the fingers to a retracted position so that the collected boards are deposited on the stack of previously deposited collected boards and wherein the fingers are positioned in the retracted lowered position ready for a new cycle, the take-away conveyor being operable independent of the lift so that an operator can manually unload boards collected in the collecting station.

2. The board handling apparatus defined in claim 1 wherein the scissor lifting mechanism includes a pair of pivotally interconnected legs, the extension actuator being operably connected to the pair of legs.

3. The board handling apparatus defined in claim 1 including a modular second take-away conveyor spaced from the first take-away conveyor for receiving and collecting boards cut to length by the sawing device in tandem with the first take-away conveyor, the second take-away conveyor defining a second collecting station and further including a modular second lift positioned under the second collecting station including a generally horizontally positioned second pair of fingers for lifting boards collected in the second take-away conveyor, the first lift and the second lift being operably interconnected to said controller for simultaneous actuation.

4. The board handling apparatus defined in claim 1 wherein the controller includes pushbuttons for manually controlling the scissor lifting mechanism and the extension actuator.

5. The board handling apparatus defined in claim 1 including a frame, the first take-away conveyor being attached to the frame and including a second take-away conveyor also attached to the frame.

6. The board handling apparatus defined in claim 5 including a modular adjustable platform operably supported on the frame for supporting the pair of fingers.

7. The board handling apparatus defined in claim 5 wherein the second take-away conveyor is adjustably secured to the frame so that the spacing between the take-away conveyors can be adjusted.

8. The board handling apparatus defined in claim 7 including a drive for driving both the first take-away conveyor and the second take-away conveyor.

9. The board handling apparatus defined in claim 8 wherein the first and second take-away conveyors include chains for moving the boards.

10. The board handling apparatus defined in claim 9 wherein the platform is operably adjustably supported on the frame for vertical movement.

11. The board handling apparatus defined in claim 10 wherein the scissor lifting mechanism includes a pair of pivotally interconnected legs, the extension actuator being operably connected to the pair of legs.

12. A modular board handling apparatus comprising:
a frame;
at least two modular take-away conveyors attached to said frame for receiving and collecting boards cut to length by a sawing device, the at least two modular take-away conveyors defining a collecting station for collecting boards and each conveyor including a conveying mechanism for moving boards to the collecting station, said at least two modular take-away conveyors being spaced apart but operably interconnected for simultaneous operation;
a drive for driving the at least two modular take-away conveyors simultaneously; and
at least one modular scissor lift positioned generally below the at least two modular take-away conveyors including at least two modular fingers for lifting and placing boards collected in the collecting station onto a pallet generally adjacent the collection station, the fingers being operably supported and being movable sequentially between a raised position, an extended position, a lowered position, and a retracted position.

13. The modular board handling apparatus defined in claim 12 wherein the at least two conveyor mechanisms are adjustably attached to the frame so that spacing between the at least two conveyors can be adjusted.

14. The modular board handling apparatus defined in claim 12 wherein the at least two modular conveyors includes a third modular take-away conveyor also operably connected to said drive for simultaneous operation with the at least two modular take-away conveyors.

15. The modular board handling apparatus defined in claim 14 wherein the at least one modular lift includes first and second modular lifts operably connected together and positioned adjacent each other for simultaneous operation.

16. The modular board handling apparatus defined in claim 15 including a controller operably connected to the first and second lifts for selectively controlling the first and second lifts as a unit.

17. A board handling apparatus for receiving, collecting, and stacking boards cut to length by a sawing device, comprising:
a frame;
at least two spaced apart take-away conveyors mounted on the frame for receiving and collecting boards cut to length by the sawing device, the take-away conveyors defining a collecting station for collecting the boards and further each including a conveying mechanism for moving boards to the collecting station;
a drive shaft for actuating the at least two spaced apart take-away conveyors;
a lift positioned generally under the collecting station, the lift including a platform, a scissor lift mechanism mounted on the frame for movably supporting the platform for vertical movement, at least two generally horizontally positioned fingers operably supported on the platform for lifting the boards collected in the collecting station, a guide on the platform for guiding the extension of the fingers, and an extension actuator for extending/retracting the fingers as a unit, the fingers being located generally under the collecting station and adjacent the at least two take-away conveyors in a non-interfering position when in a retracted lowered position such that the take-away conveyors can be used without interference from the lift if desired;
the at least two take-away conveyors and the at least two fingers being adjustably secured on the frame and the platform, respectively, so that their spacing can be adjusted; and
a controller operably connected to the scissor lifting mechanism and the extension actuator for selectively controlling the lift, the controller being constructed for automatic operation and for manually-controlled operation wherein the fingers move through a sequence including lifting the boards collected on the take-away conveyors, extending the fingers so that the collected boards are positioned beyond an end of the take-away conveyors, lowering the fingers so that the fingers and the boards are rested on a stack of previously deposited collected boards, and retracting the fingers to a retracted position so that the collected boards are deposited on the stack of previously deposited collected boards and wherein the fingers are positioned in the retracted lowered position ready for a new cycle, the take-away conveyors being operable independent of the lift so that an operator can manually unload boards collected in the collecting station.

18. The board handling apparatus defined in claim 17 wherein the controller includes pushbuttons for manually controlling the operation of the apparatus.

19. The board handling apparatus defined in claim 17 including a second lift positioned adjacent the first lift and being operably interconnected to the controller for simultaneous operation with the first lift.

* * * * *